United States Patent
Matsuo et al.

(10) Patent No.: US 9,512,769 B2
(45) Date of Patent: Dec. 6, 2016

(54) UREA WATER SUPPLY SYSTEM

(71) Applicant: TOYOTA JIDOSHA KABUSHIKI KAISHA, Toyota-shi, Aichi-ken (JP)

(72) Inventors: Junichi Matsuo, Susono (JP); Nobumoto Ohashi, Shizuoka-ken (JP); Akira Mikami, Susono (JP); Keishi Takada, Kanagawa-ken (JP); Shigeki Nakayama, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/736,687

(22) Filed: Jun. 11, 2015

(65) Prior Publication Data

US 2015/0361857 A1 Dec. 17, 2015

(30) Foreign Application Priority Data

Jun. 12, 2014 (JP) .................. 2014-121579
May 25, 2015 (JP) .................. 2015-105699

(51) Int. Cl.
*F01N 3/00* (2006.01)
*F01N 3/10* (2006.01)
(Continued)

(52) U.S. Cl.
CPC ............. *F01N 11/00* (2013.01); *F01N 3/208* (2013.01); *F01N 3/2066* (2013.01);
(Continued)

(58) Field of Classification Search
CPC .... F01N 11/00; F01N 13/011; F01N 13/0093; F01N 2610/02; F01N 2610/144; F01N 2610/146; F01N 2610/1486; F01N 2610/1493; F01N 2900/1808; F01N 2900/1822; F01N 3/2066; F01N 3/208; F01N 3/2896
(Continued)

(56) References Cited

U.S. PATENT DOCUMENTS 5,461,857 A * 10/1995 Itou .................. F01N 3/0842
                                                    60/276
6,125,629 A * 10/2000 Patchett ............. B01D 53/9431
                                                    60/284
(Continued)

FOREIGN PATENT DOCUMENTS

| EP | 2 660 436 A1 | 11/2013 |
| JP | 2010-7617 | 1/2010 |
| JP | 2014-1835 | 1/2014 |

OTHER PUBLICATIONS

Office Action issued in U.S. Appl. No. 14/737,602 dated May 5, 2016.
(Continued)

*Primary Examiner* — Thomas Denion
*Assistant Examiner* — Diem Tran
(74) *Attorney, Agent, or Firm* — Finnegan, Henderson, Farabow, Garrett & Dunner, LLP

(57) ABSTRACT

A pump share-type urea water supply system includes a first supply valve and a second supply valve. A urea water tank is connected with the respective supply valves by a urea water supply path that includes a first supply path for the first supply valve and a second supply path for the second supply valve. The second supply path has a larger capacity than the first supply path by a predetermined volume. A suck-back control controls opening and closing of the respective supply valves such that a first estimated valve-opening time of the first supply valve for suck-back control in the first supply valve and supply path is shorter than a second estimated valve-opening time of the second supply valve for suck-back control in the second supply valve and in-the-second supply path by at least a first control time corresponding to the predetermined volume.

8 Claims, 10 Drawing Sheets

(51) Int. Cl.
   *F01N 11/00*   (2006.01)
   *F01N 3/20*    (2006.01)
   *F01N 3/28*    (2006.01)
   *F01N 13/00*   (2010.01)

(52) U.S. Cl.
   CPC ....... *F01N 3/2896* (2013.01); *F01N 13/0093* (2014.06); *F01N 13/011* (2014.06); *F01N 2610/02* (2013.01); *F01N 2610/144* (2013.01); *F01N 2610/146* (2013.01); *F01N 2610/1486* (2013.01); *F01N 2610/1493* (2013.01); *F01N 2900/1808* (2013.01); *F01N 2900/1822* (2013.01); *Y02T 10/24* (2013.01)

(58) Field of Classification Search
   USPC .................................. 60/286, 295, 301, 303
   See application file for complete search history.

(56) References Cited

U.S. PATENT DOCUMENTS

| | | | | |
|---|---|---|---|---|
| 6,182,444 | B1* | 2/2001 | Fulton | B01D 53/9495 60/274 |
| 6,269,633 | B1* | 8/2001 | van Nieuwstadt | F01N 3/208 60/277 |
| 6,293,097 | B1* | 9/2001 | Wu | B01D 53/9431 417/38 |
| 6,471,924 | B1* | 10/2002 | Feeley | B01D 53/9413 422/171 |
| 6,761,025 | B1* | 7/2004 | Gladden | F01N 3/206 60/274 |
| 7,021,048 | B2 | 4/2006 | Taylor, III et al. | |
| 7,954,313 | B2 | 6/2011 | Hirata et al. | |
| 8,635,855 | B2 | 1/2014 | Mital et al. | |
| 8,997,461 | B2 | 4/2015 | Henry et al. | |
| 9,279,351 | B2 | 3/2016 | Dingle et al. | |
| 2004/0118109 | A1 | 6/2004 | Gladden | |
| 2014/0000719 | A1* | 1/2014 | Wright | B60P 3/2255 137/1 |

OTHER PUBLICATIONS

Notice of Allowance issued in U.S. Appl. No. 14/737,602 on Sep. 15, 2016.

* cited by examiner

UREA WATER SUPPLY SYSTEM

CROSS REFERENCE TO RELATED APPLICATIONS

This application claims priority to Japanese Patent Application No. 2014-121579 filed on Jun. 12, 2014 and Japanese Patent Application No. 2015-105699 filed on May 25, 2015, the entire contents of which are incorporated by reference herein.

BACKGROUND

Field of Invention

The present invention relates to a urea water supply system that supplies urea water to the exhaust emission for reduction of NOx using a selective reduction NOx catalyst provided in an exhaust passage of an internal combustion engine.

Description of the Related Art

A known configuration of an exhaust emission control device provides a selective reduction NOx catalyst (hereinafter simply referred to as "NOx catalyst") that reduces NOx included in the exhaust emission discharged from an internal combustion engine by using ammonia as a reducing agent. A supply valve is provided in the upstream of the NOx catalyst to supply urea water to the exhaust emission, in order to control the adsorption amount of ammonia on the NOx catalyst to a suitable condition for reduction of NOx. Urea water used for producing ammonia causes deposition of urea after vaporization of its water content. This may adversely affect components involved in supply of urea water, for example, the supply valve and a pump for pressure-feeding urea water.

For example, Patent Literature 1 describes the adverse effects of the released urea on the pump. More specifically Patent Literature 1 has noted that urea depositing by vaporization of water after a stop of operation of the pump is likely to enter the clearance between components of the pump and cause a trouble and provides a configuration of making a continuous flow of urea water in the pump even after a stop of operation of the pump, in order to suppress deposition of urea.

CITATION LIST

Patent Literature

PTL 1: JP 2010-7617A
PTL 2: JP 2014-1835A

SUMMARY OF INVENTION

A proposed technique provides two NOx catalysts placed in the exhaust passage for the purpose of removing NOx in the exhaust emission discharged from the internal combustion engine. The two NOx catalysts may be provided for various reasons, for example, providing two exhaust passages extended from an internal combustion engine or enhancing the efficiency of removal of NOx as much as possible. In any reason, in the technique of providing two NOx catalysts in the exhaust passage, one applicable configuration may place two supply valves corresponding to the two NOx catalysts for supplying ammonia efficiently to the respective NOx catalysts and supply the amount of urea water required for each NOx catalyst from the supply valve to the exhaust emission. In the above configuration of placing the two supply valves for supply of urea water, a pump used to pressure-feed the urea water to the respective supply valves may be shared by the respective supply valves, in order to reduce an increase in total number of components. The configuration of supplying urea water from a common pump to a plurality of supply valves is called "pump share-type" in the description below.

The urea included in urea water is the precursor of ammonia. When urea water is not supplied from the supply valve to the exhaust emission but remains in the supply valve or in a supply path connecting with the supply valve, ammonia may be produced from the remaining urea water by, for example, heat energy from the exhaust passage and accelerate corrosion of the supply valve or the supply path. The urea water filled in the supply valve and the supply path is thus required to be sucked back to a tank, when there is no need to continue supplying the urea water to the exhaust emission for the purpose of reduction of NOx.

In the case that the configuration of sucking back urea water for the purpose of supply of ammonia to the NOx catalyst is applied to the pump share-type exhaust emission control device described above, the different capacities the supply paths connecting with the respective supply valves may result in different suck-back behaviors of urea water in the respective supply paths. More specifically, the different capacities of the supply paths may cause a failure in supply of urea water (hereinafter may be simply referred to as "failure in supply"), for example, suck-back behavior causing urea water to remain in one of the supply paths.

By taking into account the problems described above, an object of the invention is to suppress the occurrence of a failure in supply of urea water as much as possible in suck-back control of urea water in two supply paths in a pump share-type urea water supply system with two supply valves and two supply paths connecting with the respective supply valves.

In order to solve the above problems, the inventors have noted the respective valve-opening times of the two supply valves during operation of the pump in the pump share-type urea water supply system. Open-close control of the respective supply valves is required for moving and sucking back urea water by the operation of the pump in the supply path of urea water. More specifically, in order to move urea water by the pressure-feed capacity of the pump, the supply valve needs to be opened to set the internal pressure of the supply path to a condition that allows for migration of urea water. The invention thus aims to adequately control the respective valve-opening times of the two supply valves during operation of the pump, in order to eliminate a failure in supply of urea water due to the difference between the capacities of the supply paths connecting with the respective supply valves.

According to one aspect of the invention, in an exhaust emission control device that is provided in an exhaust passage of an internal combustion engine and has a first NOx catalyst and a second NOx catalyst configured to reduce NOx by using ammonia as a reducing agent there is provided a urea water supply system that supplies urea water to the exhaust passage. The urea water supply system may comprise a first supply valve that is located in upstream of the first NOx catalyst and is configured to supply urea water to an exhaust emission flowing into the first NOx catalyst; a second supply valve that is located in upstream of the second NOx catalyst and is configured to supply the urea water to the exhaust emission flowing into the second NOx catalyst; a urea water tank that is configured to store the urea water; a urea water supply path that is arranged to connect the urea water tank with each of the first supply valve and the second supply valve and includes a first supply path which only the urea water to be supplied to the first supply valve flows through and a second supply path which only the urea water to be supplied to the second supply valve flows through, wherein the second supply path has a larger capacity than capacity of the first supply path by a predetermined volume; a pump that is configured to pressure-feed the urea water in the urea water supply path; and a controller that is configured to perform suck-back control, of the urea water in the first and second supply valves and in the urea water supply path by operating the pump in a specified operating state, opening the first supply valve for a first estimated valve-opening time that is a valve-opening time of the first supply valve estimated to be required for the suck-back control of the urea water in the first supply valve and in the first supply path and opening the second supply valve for a second estimated valve-opening time that is a valve-opening time of the second supply valve estimated to be required for the suck-back control of the urea water in the second supply valve and in the second supply path, the controller performing open-close control of the first supply valve and the second supply valve in the suck-back control such that the first estimated valve-opening time is shorter than the second estimated valve-opening time by at least a first control time corresponding to the predetermined volume.

The exhaust emission control device has the two NOx catalysts, i.e., the first NOx catalyst and the second NOx catalyst as described above. The urea water supply system of the invention is provided with the first supply valve for supply of urea water corresponding to the first NOx catalyst and the second supply valve for supply of urea water corresponding to the second NOx catalyst. Each of the supply valves may have any configuration that enables urea water to be supplied suitably for the corresponding NOx catalysts. Accordingly, in a range that ensures suitable supply of urea water, the respective supply valves may have an identical specification with regard to supply of urea water or may have different specifications.

In the above urea water supply system, the urea water is pressure-fed by one pump to be sucked back from the first supply valve and the second supply valve. In other words, the urea water supply system employs the configuration of pump share-type urea water supply. Migration of urea water from the urea water tank to each of the supply valves and reverse migration of urea water are through the urea water supply path. The urea water supply path is configured to enable the urea water to be flowed between the urea water tank and each of the supply valves by pressure-feeding of the pump and includes the first supply path which only the urea water to be supplied to the first supply valve flows through and the second supply path which only the urea water to be supplied to the second supply valve flows through. Accordingly, when the urea water supply path includes an additional supply path other than the first supply path and the second supply path, both the urea water to be supplied to the first supply valve and the urea water to be supplied to the second supply valve flows through this additional supply path. In other words, this additional supply path is shared by the two supply valves.

In the urea supply system of this configuration, the controller performs the suck-back control of urea water from the respective supply valves. More specifically, the controller operates the pump in the specified operating state and subsequently performs open-close control of the first supply valve and the second supply valve. The specified operating state denotes an operating state that enables the pressure-feed capacity of the pump for sucking back urea water and may be any operating state that allows for suck-back of urea water. For example, an operating unit in the pump is rotated in a predetermined rotating direction to feed urea water to the supply valve side, while being rotated in a reverse direction to suck back urea water from the supply valve side.

After the controller operates the pump in the specified operating state, opening the first supply valve allows for migration of urea water in the first supply valve and in the first supply path, while opening the second supply valve allows for migration of urea water in the second supply valve and in the second supply path. Opening both the first supply valve and the second supply valve allows for migration of urea water in the respective supply valves and in the respective supply paths. The pump is operated to move the urea water by its pressure-feed capacity. During the suck-back control of opening both the supply valves to move the urea water in the respective supply valves and in the respective supply paths to the urea water tank, suck-back of urea water may be completed at the earlier timing with respect to the first supply path having the smaller capacity. In this case, when the first supply valve is kept open, a negative pressure suitable for suck-back is unlikely to be generated in the second supply path. This may cause urea water to remain in the second supply path.

By taking into account a potential problem in supply of urea water in the pump share-type urea water supply system, the controller sets the first estimated valve-opening time that is estimated to be required for suck-back control in the first supply valve and in the first supply path to be shorter than the second estimated valve-opening time that is estimated to be required for suck-back control in the second supply valve and in the second supply path by the first control time corresponding to the predetermined volume that is the difference between the capacities of the first supply path and the second supply path, which may cause the failure in supply of urea water described above. The first estimated valve-opening time and the second estimated valve-opening time are not fixed to specific time periods but are varied according to the valve-opening pattern of the respective supply valves for suck-back of urea water. For example, in a mode that opens the first supply valve and the second supply valve simultaneously to move urea water, the pressure-feed capacity of the pump is divided to the first supply valve side and the second supply valve side. The first estimated valve-opening time and the second estimated valve-opening time in this mode may be different from the first estimated valve-opening time and the second estimated valve-opening time in a mode that individually opens the respective supply valves to move urea water.

By taking into account that the failure in supply of urea water described above is attributed to the difference between the capacities of the first supply path and the second supply path, the first estimated valve-opening time is set to be shorter than the second estimated valve-opening time, in order to effectively eliminate this failure. With regard to the failure described above, setting the first estimated valve-opening time to be shorter than the second estimated valve-opening time by the first control time suppresses the urea water remaining in the second supply path from being sucked back in the state that the first supply valve is open. This adequately allocates the pressure-feed capacity of the pump to suck back the urea water remaining in the second supply path.

In the urea water supply system of the above aspect, the first supply valve and the second supply valve may be configured such as to provide a difference between an amount of the urea water kept in the first supply valve and an amount of the urea water kept in the second supply valve. In this case, the controller may reflect a second control time corresponding to the difference in kept amount of urea water on the first control time. When there is a difference between the amount of urea water kept in the first supply valve and the amount of urea water kept in the second supply valve, the difference in kept amount may also cause the failure in supply of urea water described above, like the predetermined volume that is the difference between the capacities of the respective supply paths. Setting the first estimated valve-opening time to be shorter than the second estimated valve-opening time with reflecting the second control time on the first control time more effectively eliminates the above failure. For example, when the amount of urea water kept in the second supply valve is greater than the amount of urea water kept in the first supply valve, the first estimated valve-opening time may be set to be shorter than the second estimated valve-opening time by a control time that is the sum of the first control time and the second control time corresponding to the difference in kept amount of urea water. When the amount of urea water kept in the first supply valve is greater than the amount of urea water kept in the second supply valve, on the other hand, the first estimated valve-opening time may be set to be shorter than the second estimated valve-opening time by a control time that is a difference by subtracting the second control time from the first control time.

In the urea water supply system of the above aspect, in the suck-back control, the controller may operate the pump in the specified operating state, individually perform a valve-opening operation for sucking back the urea water kept in the first supply valve and a valve-opening operation for sucking back the urea water kept in the second supply valve, and subsequently perform the open-close control of the first supply valve and the second supply valve to suck back the urea water in the first supply path and in the second supply path. The respective supply valves serve to supply urea water to the exhaust emission and are thus placed at the positions relatively susceptible to the high temperature of the exhaust emission. In the temperature environment, ammonia is likely to be produced from the urea water kept in each of the supply valves. This is likely to cause a problem such as corrosion of the supply valve.

As described above, the controller of this aspect individually sucks back the urea waters respectively kept in the supply valves and subsequently sucks back the urea waters in the respective supply paths. This effectively protects the respective supply valves from the produced ammonia. In the urea water supply system of this aspect, suck-back of the urea water kept in the first supply valve and suck-back of the urea water in the first supply path are differentiated conceptually. The total valve-opening time of the first supply valve required for both the suck backs corresponds to the first estimated valve-opening time described above. The same applies to the second estimated valve-opening time.

The urea water supply system of the above aspect may further comprise a determiner that is configured to perform a determination process of determining whether either of the first supply valve and the first supply path is clogged, based on a pressure in the urea water supply path or in the pump during the suck-back control. In this aspect, when the determiner determines that the first supply valve or the first supply path is clogged, the controller may additionally open the first supply valve after elapse of the first estimated valve-opening time in the suck-back control, while operating the pump in the specified operating state.

The urea water is moved through the urea water supply path by the pressure-feed capacity of the pump. Accordingly, when the urea water is smoothly moved through the urea water supply path, a specific pressure condition that allows for migration of urea water is provided. When the first supply valve or the first supply path is clogged, for example, due to soot entering the first supply valve, on the other hand, opening the first supply valve for the first estimated valve-opening time during operation of the pump by the controller may fail in providing a target state with regard to urea water (for example, the state that no urea water remains by the suck-back control, hereinafter referred to as "predetermined target state") inside of the first supply valve or inside of the first supply path. Additionally, a state inside of the second supply valve or inside of the second supply path may be affected by the state inside of the first supply valve or inside of the first supply path to become an unexpected state. This may result in providing a pressure condition in the urea water supply path or the pump different from an expected pressure condition. The determiner may thus determine whether the first supply valve or the first supply path is clogged, based on the pressure in the urea water supply path or in the pump.

When the determiner determines that the first supply valve or the first supply path is clogged, it is expected that opening the first supply valve for the first estimated valve-opening time in the suck-back control does not cause inside of the first supply valve and inside of the first supply path to reach the predetermined target state. In this case, additionally opening the first supply valve after elapse of the first estimated valve-opening time effectively causes the state inside of the first supply valve and inside of the first supply path to reach the predetermined target state and thereby suppresses the occurrence of a failure in supply of urea water.

Configurations described below may be employed with respect to the determination process performed in the urea water supply system of the above aspect with the determiner. In the urea water supply system of the above aspect, according to a first configuration, the determiner may perform the determination process, based on a pressure value in the urea water supply path or in the pump or a pressure variation per unit time in the urea water supply path or in the pump in a state that the pump is maintained in the specified operating state for the suck-back control, the first supply valve is open and the second supply valve is closed. In this configuration, the suck-back of urea water is performed with regard to the first supply valve in the state that the first supply valve is opened and the second supply valve is closed. When the first supply valve or the first supply path is clogged, such clogging interferes with smooth suck-back of urea water. As a result, this causes the pressure value or its pressure variation to be different from a pressure value or its pressure variation in the state that neither the first supply valve nor the first supply path is clogged. This configuration enables the determiner to perform the determination process in the suck-back control by taking advantage of the difference in pressure value or pressure variation.

In the urea water supply system of the above aspect, according to a second configuration with respect to the above determination process, the determiner may determine that the first supply valve or the first supply path is clogged when a predetermined negative pressure condition is not provided in the urea water supply path or in the pump in a state that the first supply valve is closed and only the second supply valve is open, after elapse of the first estimated valve-opening time in a state that the pump is maintained in the specified operating state for the suck-back control and both the first supply valve and the second supply valve are open. In this configuration, if the first supply valve or the first supply path is clogged, after elapse of the first estimated valve-opening time in the state that both the supply valves are open, urea water may still remain in the first supply path with regard to which suck-back of urea water is expected to be completed, and suck-back of urea water in the second supply path has already been completed instead. In this case, even when only the second supply valve is open after elapse of the first estimated valve-opening time to suck back the urea water in the second supply path, a predetermined negative pressure condition for sucking back the urea water may thus not be provided in the urea water supply path or in the pump, due to the lack of remaining urea water or a less amount of remaining urea water than expected. This configuration enables the determiner to perform the determination process in the suck-back control by taking into account this phenomenon.

In the urea water supply system of the above aspect, according to a third configuration with respect to the above determination process, the determiner may determine that the first supply valve or the first supply path is clogged when a pressure value in the urea water supply path or in the pump becomes close to an atmospheric pressure before elapse of the first estimated valve-opening time in a state that the pump is maintained in the specified operating state for the suck-back control and both the first supply valve and the second supply valve are open. Like the second configuration. described above, in this configuration, if the first supply valve or the first supply path is clogged, after elapse of the first estimated valve-opening time in the state that both the supply valves are open, urea water may still remain in the first supply path with regard to which suck-back of urea water is expected to be completed, and suck-back of urea water in the second supply path has already been completed instead. In some conditions, suck-back of urea water in the second supply path may be completed before elapse of the first estimated valve-opening time. In this case, the pressure value in the urea water supply path or in the pump may become close to the atmospheric pressure. This may fail in providing a predetermined negative pressure condition. This configuration enables the determiner to perform the determination process in the suck-back control by taking into account this phenomenon.

In the urea water supply system of any of the above aspects with the determiner, the first NOx catalyst and the second NOx catalyst may be arranged in series along a flow of the exhaust emission in time exhaust passage of the internal combustion engine, and the first NOx catalyst may be placed in upstream of the second NOx catalyst. In the exhaust emission control device having such configuration of the NOx catalysts, the first supply valve corresponding to the first NOx catalyst located on the upstream side is placed nearer to the internal combustion engine than the second supply valve. The first supply valve is accordingly exposed to the environment that makes soot in the exhaust emission more likely to enter the supply valve through its opening. The determination process by the determiner described above is thus especially advantageous in this configuration. This is, however, not intended to interfere with employing any other configuration of NOx catalysts in the urea water supply system of the invention. For example, the configuration with regard to the determiner described above may be applied to a configuration that the first NOx catalyst and the second NOx catalyst are arranged in parallel in the exhaust passage of the internal combustion engine. In this latter configuration, the amount of soot included in the exhaust emission flowing into the first NOx catalyst may not be necessarily greater than the amount of soot included in the exhaust emission flowing into the second NOx catalyst.

The above aspects of the invention suppress the occurrence of a failure in supply of urea water as much as possible in suck-back control of urea water in two supply paths in a pump share-type urea water supply system with two supply valves and two supply paths connecting with the respective supply valves.

DESCRIPTION OF EMBODIMENTS

The following describes some concrete embodiments of the invention with reference to the drawings. The dimensions, the materials, the shapes, the positional relationships and the like of the respective components described in the following embodiments are only for the purpose of illustration and not intended at all to limit the scope of the invention to such specific descriptions.

First Embodiment

Figure 1:
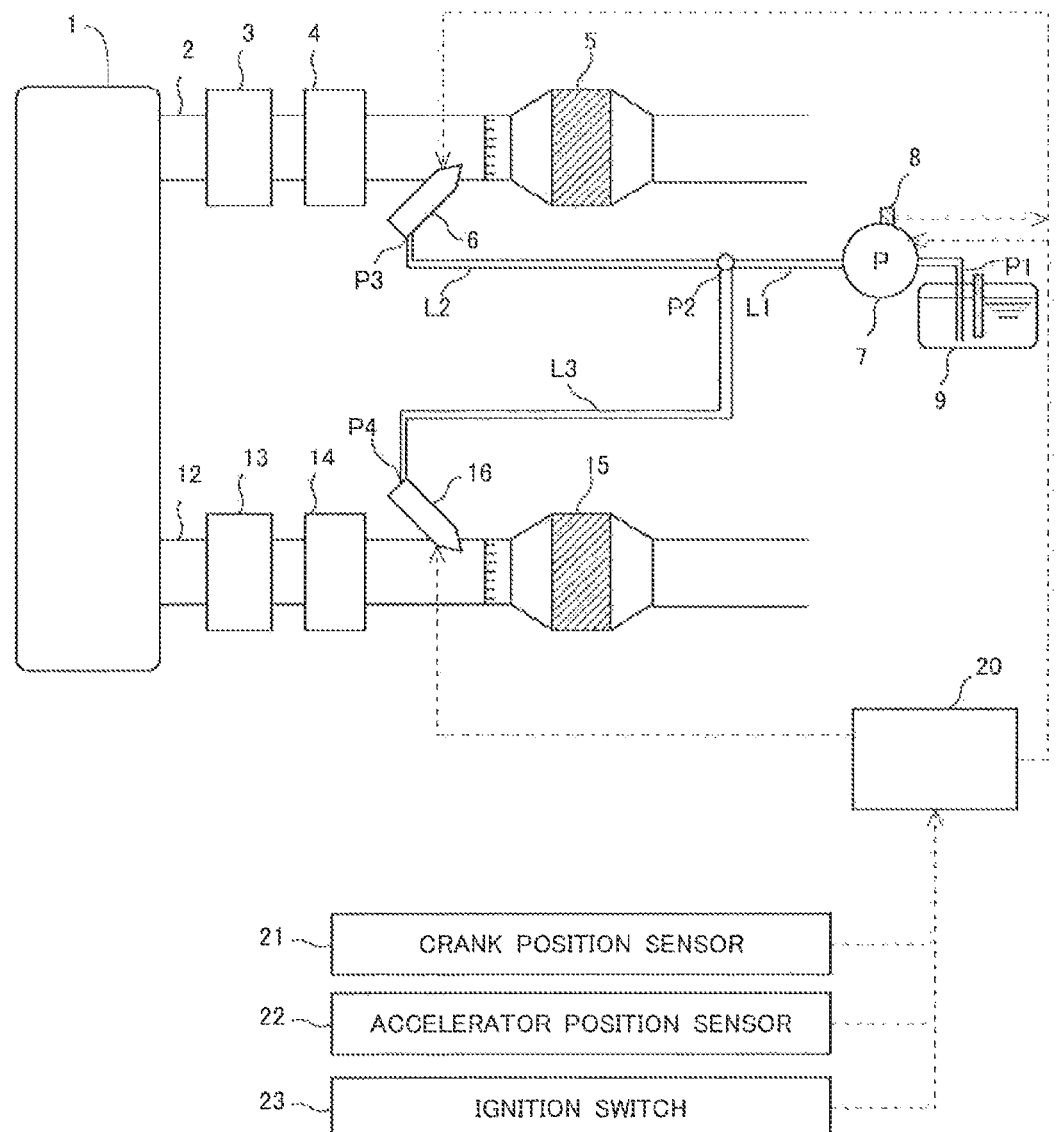
FIG. 1 is a first diagram schematically illustrating a configuration of a urea water supply system for an exhaust emission control device of an internal combustion engine according to the invention.
Figure 2:
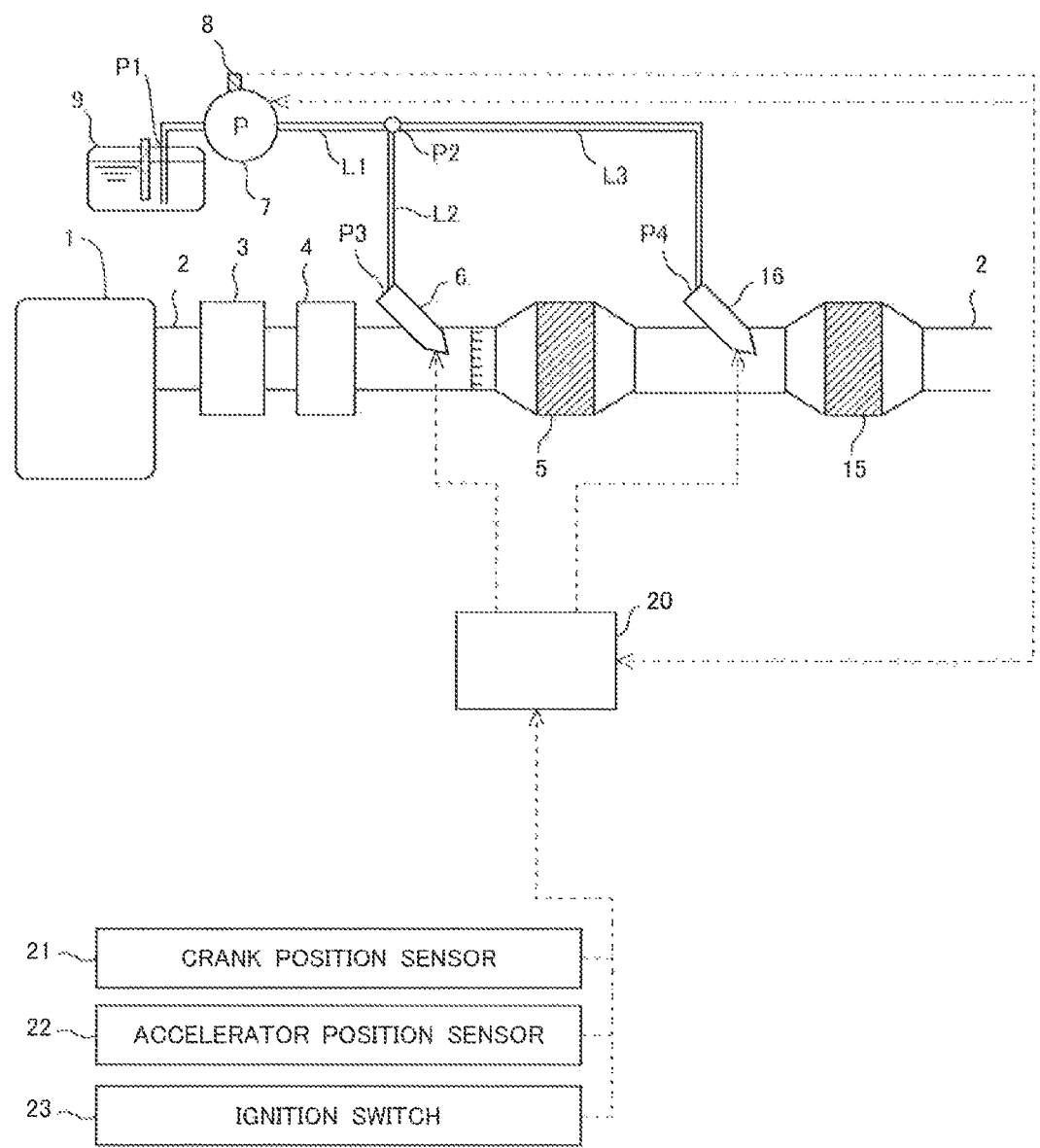
FIG. 2 is a second diagram schematically illustrating another configuration of the urea water supply system for the exhaust emission control device of the internal combustion engine according to the invention.

The following describes the schematic configurations of a urea water supply system (hereinafter may simply be referred to as "system") and an exhaust emission control device of an internal combustion engine which the system is applied to, with reference to FIGS. 1 and 2. An internal combustion engine 1 shown in FIG. 1 is a diesel engine for driving a vehicle. The internal combustion engine of the invention is, however, not limited to the diesel engine but may be a gasoline engine or the like. The urea water supply system of the invention is configured to supply urea water to supply valves that are arranged to supply ammonium as a reducing agent to two NOx catalysts provided in an exhaust passage of the internal combustion engine 1. Exhaust emission control devices of FIGS. 1 and 2 are illustrated as examples of the exhaust emission control device of the internal combustion engine which the system is applied to and are not at all intended to limit the application of the invention to both or either of the exhaust emission control devices.

<First Configuration>

The following describes a first configuration of the urea water supply system of the invention and the exhaust emission control device of the internal combustion engine 1 which the urea water supply system is applied to, with reference to FIG. 1. The internal combustion engine 1 is a V engine and has two connected exhaust passages 2 and 12 corresponding to respective banks of the V engine. The respective exhaust passages 2 and 12 basically have similar schematic configurations. A first NOx catalyst 5 is placed in the exhaust passage 2 to selectively reduce NOx in exhaust emission using ammonia as the reducing agent. In order to produce ammonia that works as the reducing agent in the first NOx catalyst 5, urea water as a precursor of ammonia is stored in a urea water tank 9 and is supplied to the exhaust emission by means of a first supply valve 6 that is located in the upstream of the first NOx catalyst 5. The urea water supplied by the first supply valve 6 is hydrolyzed with heat of exhaust emission to produce ammonia. The ammonia then flows into and is adsorbed to the first NOx catalyst 5, so that NOx in the exhaust emission is removed through reduction reaction of ammonia with NOx. An oxidation catalyst for oxidizing ammonia slipped from the first NOx catalyst 5 (hereinafter referred to as "ASC catalyst") is provided in the downstream of the first NOx catalyst 5, although not being illustrated in FIG. 1.

Additionally, an oxidation catalyst 3 having oxidation function and a filter 4 for trapping particulate substances in the exhaust emission are provided in the upstream of the first NOx catalyst 5 and the first supply valve 6. The oxidation catalyst 3 serves to oxidize a fuel component included in the exhaust emission, raise the temperature of the exhaust emission and flows out the heated exhaust emission to the filter 4, so that the particulate substances trapped by the filter 4 are oxidized and removed. The temperature rise of the exhaust emission by the oxidation catalyst 3 is achieved by adequately controlling the combustion conditions in the internal combustion engine 1 to regulate the fuel component (uncombusted component) in the exhaust emission and accelerate oxidation of the fuel component by the oxidation catalyst 3. Alternatively, a fuel supply valve may be provided in the upstream of the oxidation catalyst 3 to supply the fuel of the internal combustion engine 1 to the oxidation catalyst 3 via the exhaust emission.

A second NOx catalyst 15 and a second supply valve 16 for supply urea water corresponding to the NOx catalyst are also provided in the exhaust passage 12 provided in parallel to the exhaust passage 2. Additionally, an oxidation catalyst 13 having oxidation function and a filter 14 for trapping particulate substances in the exhaust emission are provided in the upstream of the second NOx catalyst 15 and the second supply valve 16.

The following describes a configuration of supplying urea water from the urea water tank 9 to the first supply valve 6 and the second supply valve 16. The urea water tank 9 is connected with the first supply valve 6 by a supply path L1 (supply path division from a point P1 on the urea water tank 9-side to a branch point P2) and a supply path L2 (supply path division from the branch point P2 to a first supply valve P3) that are arranged to supply the urea water. The urea water tank 9 is, on the other hand, connected with the second supply valve 16 by the supply path L1 and a supply path L3 (supply path division from the branch point P2 to a second supply valve P4) that are arranged to supply the rear water. Accordingly, the supply path L1 is shared by the supply paths formed between the urea water tank 9 and the first supply valve 6 and between the urea water tank 9 and the second supply valve 16, and only the flow of urea water to be supplied to each of the supply valves is pressure-fed through the supply path from the branch point P2 to each supply valve. A pump 7 for pressure-feeding the urea water in the supply paths L1 to L3 is provided in the common supply path L1. Normal rotation of the pump 7 causes the urea water to be pressure fed from the urea water tank 9 to each supply valve, and reverse rotation of the pump 7 causes the urea water to be pressure fed from each supply valve to the urea water tank 9.

The exhaust passages 2 and 12, the urea water tank and the supply paths of urea water are placed along the vehicle body frame. In this embodiment, the urea water tank 9 is placed at the position nearer to the exhaust passage 2. With regard to the supply paths of urea water, the overall length of the supply path L2 for the flow of urea water including the first supply valve 6 is thus shorter than the overall length of the supply path L3 for the flow of urea water including the second supply valve 16 (i.e., L2<L3). In this embodiment, the supply paths L1, L2 and L3 have an identical sectional area. The different lengths of the supply paths L2 and L3 accordingly causes the capacity of the supply path L3 to be greater than the capacity of the supply path L2 by a specified volume ΔV.

A pressure sensor 8 is mounted to the pump 8 to detect the internal pressure of the supply path L1 for the urea water. The internal combustion engine 1 is provided with an electronic control unit (ECU) 20 that controls the operating conditions of the internal combustion engine 1 and the exhaust emission control device. The ECU 20 is electrically connected with a crank positions sensor 21 and an accelerator position sensor 22 in addition to the above pressure sensor 8 to receive detection values sent from the respective sensors. The ECU 20 accordingly obtains the operating conditions of the internal combustion engine 1, such as the detected internal pressure of the supply path L1, the engine rotation speed based on the detection of the crank position sensor 21 and the engine load based on the detection of the accelerator position sensor 22. The internal pressure of the supply path L1 may alternatively be estimated from, for example, the relationship between the driving power and the rotation speed of the pump 7. For example, in the pump 7, based on the phenomenon that an increase in pressure of urea water reduces the increase rate of rotation speed relative to driving power, the pressure of urea water may be estimated by using the relationship between the driving power and the rotation speed. This modified configuration allows for omission of the pressure sensor 8. Additionally, the ECU 20 is electrically connected with an ignition switch 23 to receive an ignition ON/OFF signal of the internal combustion engine 1. The pump 7, the first supply valve 6 and the second supply valve 16 are also electrically connected with the ECU 20 and are driven in response to control signals from the ECU 20.

<Second Configuration>

The following describes a second configuration of the urea water supply system of the invention and the exhaust emission control device of the internal combustion engine 1 which the urea water supply system is applied to, with reference to FIG. 2. The like components of the urea supply system and the exhaust emission control device of the second configuration that are substantially similar to the components of the first configuration are expressed by the like signs and are not specifically described here.

The internal combustion engine 1 of this configuration has one exhaust passage 2. Two NOx catalysts are arranged in series in the exhaust passage 2. More specifically, a first NOx catalyst 5 is arranged in the upstream along the flow of the exhaust emission, and a second NOx catalyst 15 is arranged in the downstream. In order to produce ammonia that works as the reducing agent in the first NOx catalyst 5, urea water stored in a urea water tank 9 is supplied to the exhaust emission by means of a first supply valve 6 that is located in the upstream of the first NOx catalyst 5. Similarly, in order to produce ammonia that works as the reducing agent in the second NOx catalyst 15, the urea water stored in the urea water tank 9 is supplied to the exhaust emission by means of a second supply valve 16 that is located in the upstream of the second NOx catalyst 15 but in the downstream of the first NOx catalyst 5. An oxidation catalyst 3 having oxidation function and a filter 4 for trapping particulate substances in the exhaust emission are provided in the upstream of the first NOx catalyst 5 and the first supply valve 6.

The following describes a configuration of supplying urea water from the urea water tank 9 to the first supply valve 6 and the second supply valve 16 in the urea water supply system applied to the exhaust emission control device described above. Like the first configuration, in the second configuration, the urea water tank 9 is connected with the first supply valve 6 by a supply path L1 (supply path division from a point P1 on the urea water tank 9-side to a branch point P2) and a supply path L2 (supply path division from the branch point P2 to a first supply valve P3) that are arranged to supply the urea water. The urea water tank 9 is, on the other hand, connected with the second supply valve 16 by the supply path L1 and a supply path L3 (supply path division from the branch point P2 to a second supply valve P4) that are arranged to supply the rear water. Accordingly, the supply path L1 is shared by the supply paths formed between the urea water tank 9 and the first supply valve 6 and between the urea water tank 9 and the second supply valve 16, and only the flow of urea water to be supplied to each of the supply valves is pressure-fed through the supply path from the branch point P2 to each supply valve.

In this embodiment, the urea water tank 9 is placed at the position nearer to the first supply valve 6 than the second supply valve 16. With regard to the supply paths of urea water, the overall length of the supply path L2 for the flow of urea water including the first supply valve 6 is thus shorter than the overall length of the supply path L3 for the flow of urea water including the second supply valve 16. Like the first configuration, this results in making the capacity of the supply path L3 greater than the capacity of the supply path L2 by a specified volume $\Delta V$.

<Control with Regard to Supply of Urea Water>

In the first and the second configurations described above, the urea water is pressure-fed, from the urea water tank 9 to each supply valve and is supplied to the exhaust emission, in order to reduce NOx included in the discharged exhaust emission during operation of the internal combustion engine 1. When the urea water remains in any of the supply valves and the supply paths in the state that the internal combustion engine 1 is stopped or at a stop, ammonia is likely to be produced from the remaining urea water due to, for example, external heat and cause corrosion of the supply valve or the supply path. The urea water supply system of the invention performs control with regard to supply of urea water, in order to prevent the urea water from remaining in any of the supply valves and the supply paths when there is no requirement for using the urea water in the exhaust emission control device of the internal combustion engine 1.

More specifically, the urea water supply system of the invention performs suck-back control to return the urea water remaining in any of the supply valves and the supply paths at a stop of the internal combustion engine 1 to the urea water tank 9, as the control with regard to supply of urea water. The following describes the details of the suck-back control on the assumption that the suck-back control is performed in the the urea water supply system and the exhaust emission control device of the first configuration shown in FIG. 1 as a typical example. This is, however, only for the purpose of illustration and is not intended at all to limit the conditions of the control to this configuration.

<Suck-Back Control>

Figure 3:
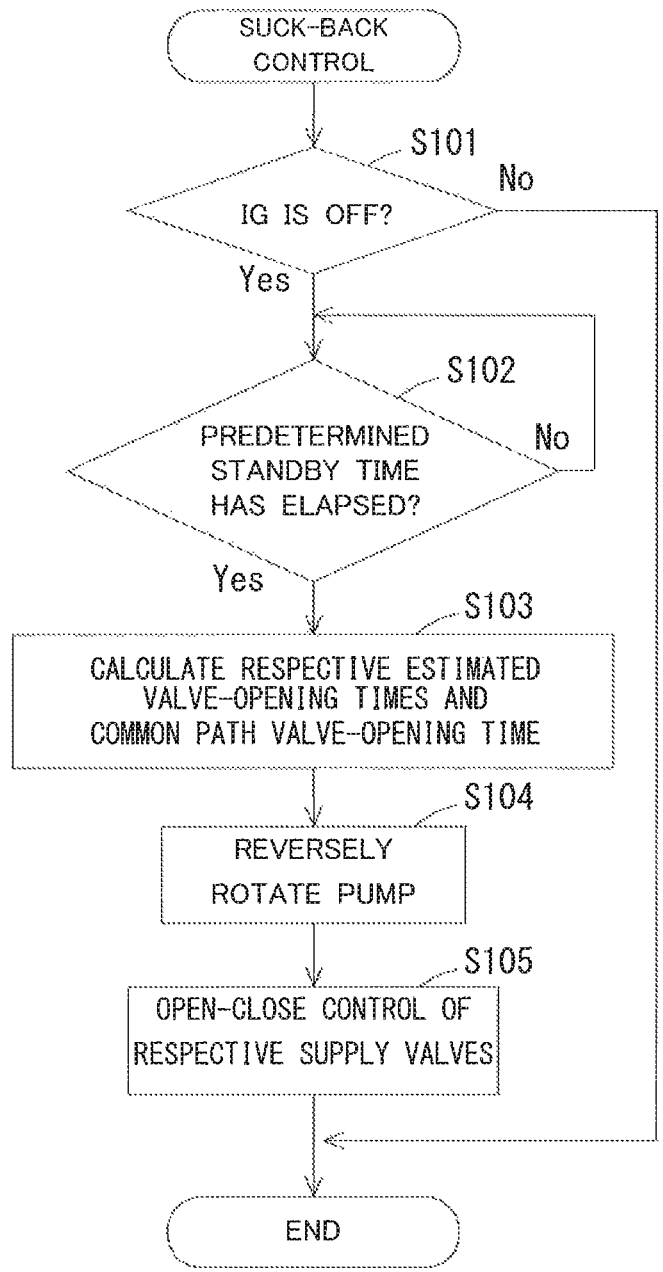
FIG. 3 is a flowchart showing a first flow of suck-back control of urea water performed in the urea water supply system shown in FIG. 1 or FIG. 2.

A flow of suck-back control performed in the urea water supply system of the invention is described with reference to FIG. 3. FIG. 3 is a flowchart of suck-back control performed by the ECU 20. The suck-back control is repeatedly performed at predetermined time intervals by the ECU 20 during operation of the internal combustion engine 1. The ECU 20 corresponds to a computer including a CPU and a memory. The computer executes a control program to perform the control shown in the flowchart of FIG. 3 or another control.

At S101, the flow determines whether ignition of the internal combustion engine is turned OFF i.e., whether an engine stop instruction is given to the internal combustion engine 1. In response to an affirmative answer at S101, the flow proceeds to S102. In response to a negative answer at S101, the flow terminates this control. During operation of the internal combustion engine 1, urea water is supplied to the exhaust emission from each supply valve for reduction of NOx included in the exhaust emission. The urea water thus remains in each of the supply valves and the supply paths immediately after an engine stop.

At S102, the flow determines whether a predetermined standby time has elapsed since the stop of the internal combustion engine 1. The flow of the exhaust emission remains to some extent in the exhaust passages 2 and 12 immediately after the stop of the internal combustion engine 1. Opening each of the supply valves for sucking back the urea water in this state makes the soot likely to enter through the opening of the opened supply valve and clog the supply valve or the supply path. The predetermined standby time is accordingly set to wait for sucking back the urea water until the flow of the exhaust emission in the exhaust passages 2 and 12 is reduced to such a degree that suppresses invasion of the soot in the valve-opening position. In response to an affirmative answer at S102, the flow proceeds to S103. In response to a negative answer at S102, the determination of S102 is repeated.

Subsequently, at S103, the flow calculates respective estimated valve-opening times and a common path valve-opening time that are estimated to be required for sucking the urea water remaining in the first supply valve 6, the second supply valve 16 and the supply paths L1 to L3 back to the urea water tank 9 by means of the pump 7. According to this embodiment, the estimated valve-opening time with regard to the first supply valve 6 and the supply path L2 is called first estimated valve-opening time, and the estimated valve-opening time with regard to the second supply valve 16 and the supply path L3 is called second estimated valve-opening time. These estimated valve-opening times may be varied according to a specific suck-back configurations employed, for example, a configuration of individually sucking back the remaining urea water on the first supply valve 6-side and the second supply valve 16-side or a configuration of simultaneously sucking back the remaining urea water on the first supply valve 6-side and the second supply valve 16-side. Calculation of specific examples of the estimated valve-opening times will be described later according to specific suck-back configurations. The common path valve-opening time denotes a valve-opening time required for sucking back the urea water kept in the common supply path L1 shared by the first supply valve 6 and the second supply valve 16. On completion of S103, the flow proceeds to S104.

At S104, the flow reversely rotates the pump 7, so as to apply a pressure for sucking back to the urea water tank 9 to the urea water remaining in the supply paths L1 to L3. According to this embodiment, the pump 7 is reversely rotated at a constant rotation speed in this reversely rotating state. This provides substantially constant pressure-feed capacity of the pump 7 for sucking back. The reversely rotating state of the pump 7 corresponds to the specified operating state for suck-back of the claims. On completion of S104, the flow proceeds to S105.

At S105, the flow performs open-close control of the first supply valve 6 and the second supply valve 16, while the pump 7 is maintained in the specified operating state (reversely rotating state) at S104. The respective supply valves 6 and 16 are opened and closed, such that the valve-opening time of each supply valve is set equal to the corresponding estimated valve-opening time calculated at S103. Opening the first supply valve 6 sucks back the urea water kept in the first supply valve 6 and the urea water in the supply paths L2 and L1. Opening the second supply valve 16 sucks back the urea water kept in the second supply valve 16 and the urea water in the supply paths L3 and L1. Inadequate open-close control of the respective supply valves is unlikely to sufficiently suck back the urea water in the estimated valve-opening times and makes the urea water likely to remain in the supply path.

Figure 4:
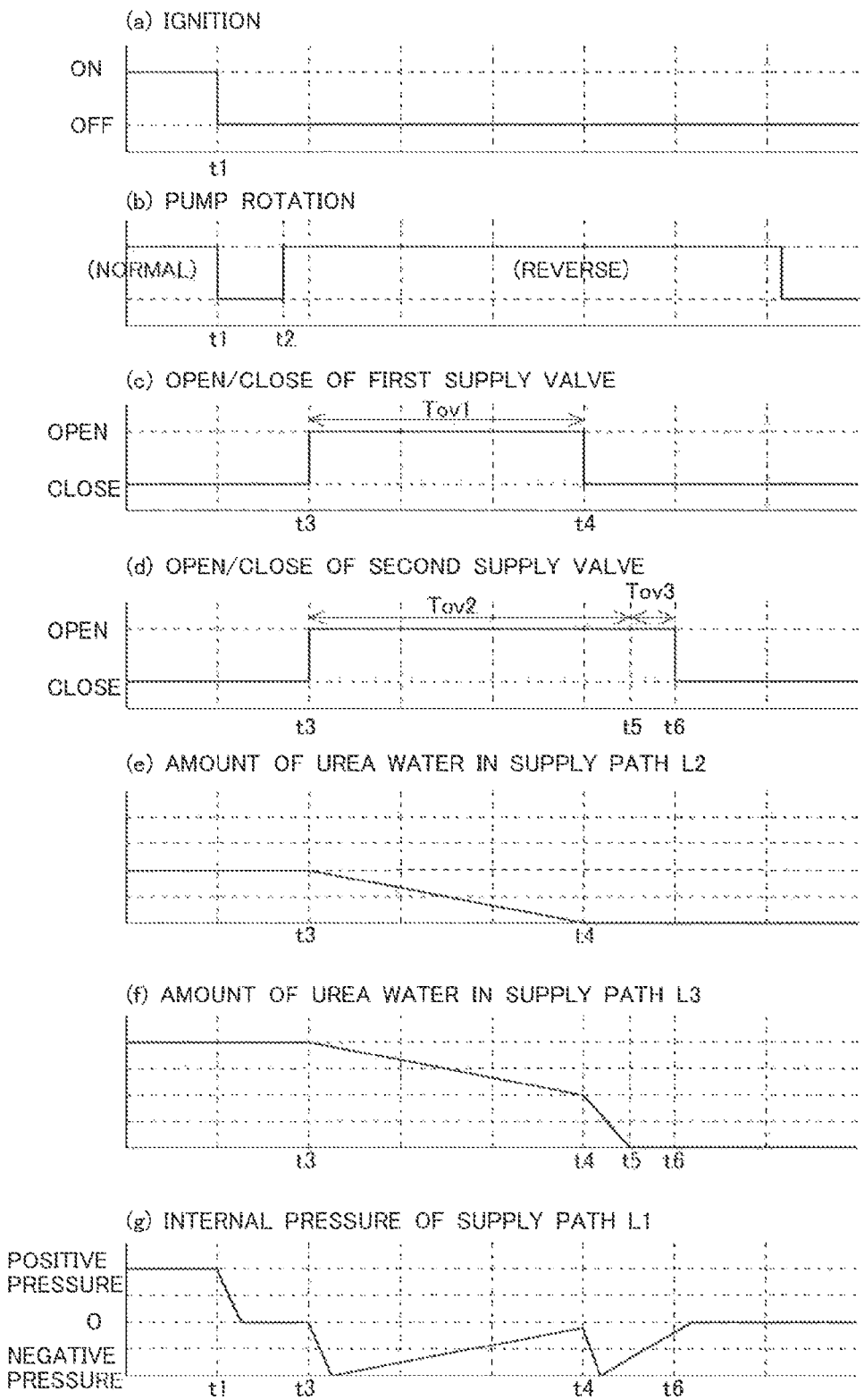
FIG. 4 is a first time chart showing variations of control elements such as supply valves in the course of the suck-back control of FIG. 3.
Figure 5:
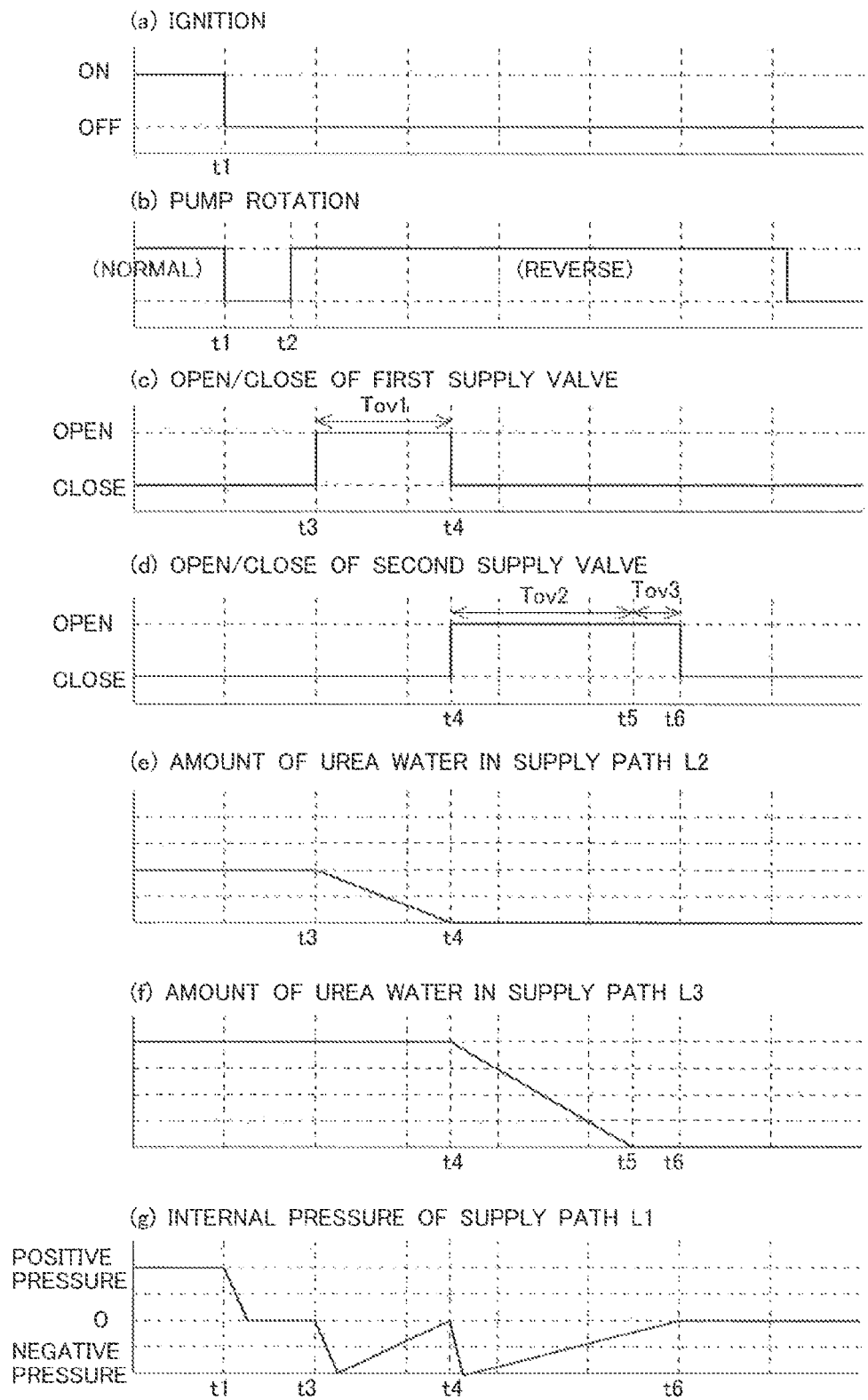
FIG. 5 is a second time chart showing variations of the control elements such as the supply valves in the course of the suck-back control of FIG. 3.
Figure 6:
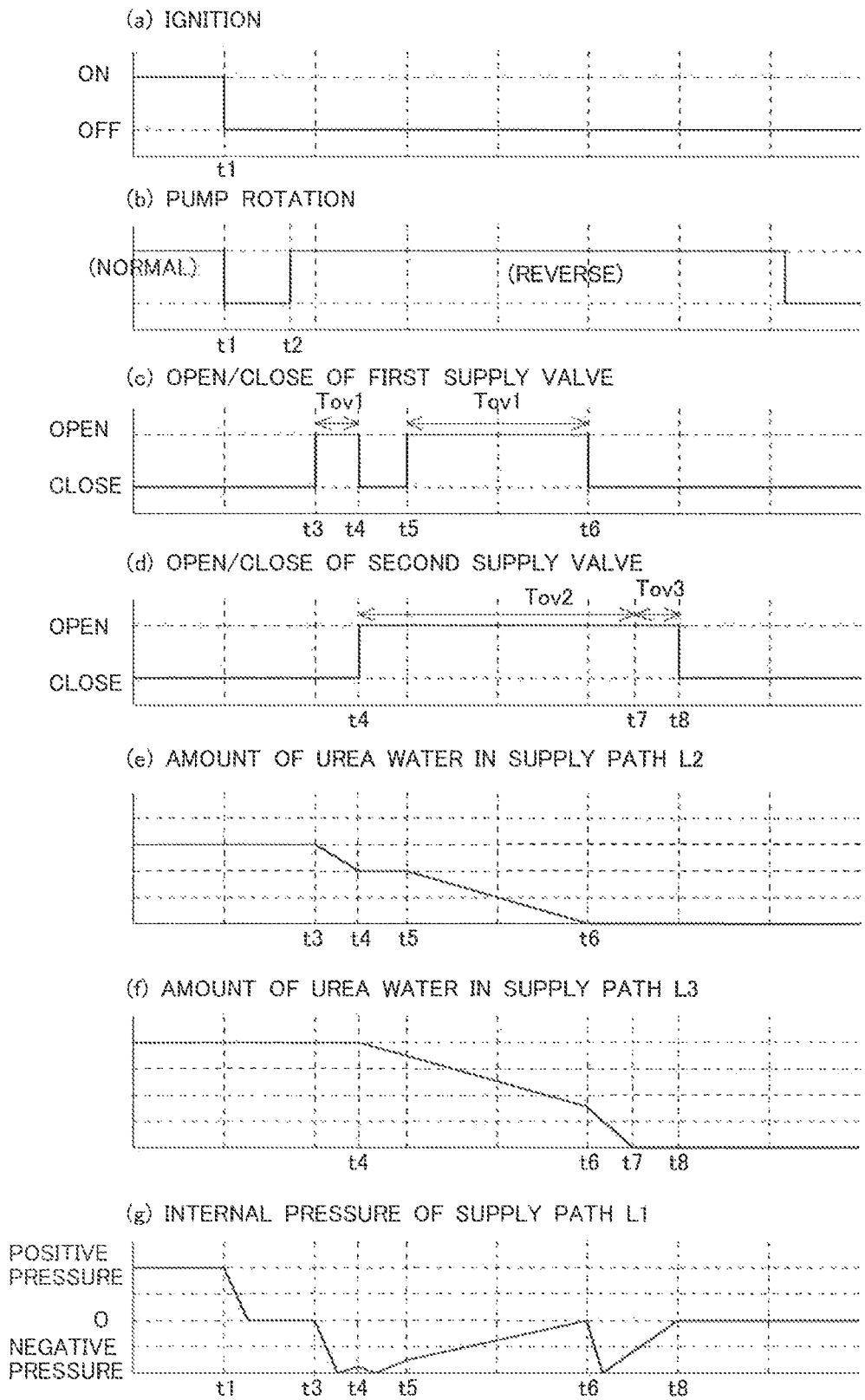
FIG. 6 is a third time chart showing variations of the control elements such as the supply valves in the course of the suck-back control of FIG. 3.

The following describes the open-close control of the supply valves for adequately sucking back the urea water and the calculation of the estimated valve-opening times of the respective supply valves with reference to FIGS. 4 to 6. FIGS. 4 to 6 are time charts showing (a) variation in ignition signal, (b) variation in pump rotation signal, (c) variation in open-close signal of the first supply valve 6, (d) variation in open-close signal of the second supply valve 16, (e) variation in amount of urea water in the supply path L2, (f) variation in amount of urea water in the supply path L3 and (g) variation in internal pressure of the supply path L1 with respect to the open-close control of the respective supply valves in various different suck-back patterns. The internal pressure of the supply path L1 denotes the pressure detected by the pressure sensor 8. The following describes the open-close control of the respective supply valves in the respective patterns of FIGS. 4 to 6.

(1) First Pattern

The following describes a first pattern of the open-close control of the respective supply valves with reference to FIG. 4. The ignition signal is turned OFF at a time t1 as shown in FIG. 4(a), and the pump 7 is reversely rotated at a time t2 as shown in FIG. 4(b) after elapse of the predetermined standby time (processing of S104). The pump 7 has the constant rotation speed and maintains the substantially constant pressure-feed capacity as described above. The processing of S105 is subsequently performed at a time t3. In the first pattern, as shown in FIGS. 4(c) and 4(d), the first supply valve 6 and the second supply valve 16 are simultaneously opened at the time t3, so as to simultaneously suck back the urea water kept in the respective supply valves 6 and 16 and the urea water in the supply paths L2 and L3.

A first estimated valve-opening time Tov1 and a second estimated valve-opening time Tov2 in the first pattern are calculated by taking into account this suck-back configuration. It is here assumed that the volume of urea water kept in the first supply valve 6 is equal to the volume of urea water kept in the second supply valve 16. With regard to suck-back of the urea water, the amount of urea water to be sucked back from the first supply valve 6-side is accordingly smaller than the amount of urea water to be sucked back from the second supply valve 16-side by the predetermined volume $\Delta V$ that is the difference between the capacities of the supply path L3 and the supply path L2. In the case of simultaneously starting suck-back of the respective supply valves 6 and 16, there is a need to close the first supply valve 6 at an earlier timing corresponding to the predetermined volume $\Delta V$ than the second supply valve 16. If the first supply valve 6 is kept open even after completion of sucking back the urea water kept in the first supply valve 6 and the urea water in the supply path L2, the pressure-feed capacity of the pump 7 is not efficiently allocated to suck back the urea water remaining in the supply path L3. As a result, this makes the urea water in the supply path unlikely to be sufficiently sucked back to the urea water tank 9 even after elapse of the estimated valve-opening times of the respective supply valves 6 and 16.

The first estimated valve-opening time Tov1 and the second estimated valve-opening time Tov2 are calculated according to Equations (1) and (2) given below:

$$Tov1 = V1/(\alpha/2) \quad (1)$$

where V1 represents the sum of the capacity of the first supply valve 6 and the capacity of the supply path L2, and $\alpha$ represents the pressure-feed capacity of the pump 7; and $$Tov2 = Tov1 + \Delta V/\alpha \quad (2)$$

A common path valve-opening time Tov3 is calculated according to Equation (3) given below:

$$Tov3 = V2/\alpha \quad (3)$$

where V2 represents the capacity of the supply path L1.

The first estimated valve-opening time Tov1 is set to be shorter than the second valve-opening time Tov2 by a time corresponding to the predetermined volume $\Delta V$ (i.e., $\Delta V/\alpha$, this time corresponds to the first control time of the claims). In the first pattern, the respective supply valves 6 and 16 are opened at the time t3, and the first supply valve 6 is closed at a time t4 after elapse of the first estimated valve-opening time Tov1 as shown in FIGS. 4(c) and 4(d). At the time t4, the urea water still remains in the supply path L3. The second supply valve 16 is kept open even after the time t4, so as to continue sucking back the urea water in the supply path L3 and in the supply path L1. The second supply valve 16 is closed at a time t6 after elapse of the total time of the second estimated valve-opening time Tov2 and the common path valve-opening time Tov3 from the time t3.

Such valve-closing control starts decreasing the amount of urea water in the supply path L2 at the time t3 and completes the suck-back at the time t4 as shown in FIG. 4(e). This also starts decreasing the amount of urea water in the supply path L3 at the time t3 and increases the decrease rate at the time t4 as shown in FIG. 4(f). This is because the entire pressure-feed capacity of the pump 7 is allocated to suck back the urea water in the supply path L3 after the time t4, as shown by the above equations. The suck-back of the urea water in the supply path L3 is completed at a time t5 prior to the time t6 as shown in FIG. 4(f).

As shown in FIG. 4(g), immediately after the time t3 when the first supply valve 6 and the second supply valve 16 are simultaneously opened, a negative pressure suitable for suck-back is generated in the supply path L1. This causes the urea water in the supply paths L2 and L3 to be sucked back into the urea water tank 9. Immediately after the time t4 when the first supply valve 6 is closed while the second supply valve 16 is kept open, a negative pressure suitable for suck-back is also generated in the supply path L1. This clearly shows that sucking back the urea water remaining in the supply path L3 suitably continues after completion of sucking back the urea water in the supply path L2. The open-close control of the respective supply valves in the first pattern, controls the valve-opening times of the respective supply valves according to the predetermined volume ΔV, thus reducing the likelihood that the urea water is not sufficiently sucked back but remains in the supply path.

(2) Second Pattern

The following describes a second pattern of the open-close control of the respective supply valves with reference to FIG. 5. The ignition signal is turned OFF at a time t1 as shown in FIG. 5(a), and the pump 7 is reversely rotated at a time t2 as shown in FIG. 5(b) after elapse of the predetermined standby time (processing of S104). The pump 7 has the constant rotation speed and maintains the substantially constant pressure-feed capacity as described above. The processing of S105 is subsequently started at a time t3. In the second pattern, as shown in FIGS. 5(c) and 5(d), at the time t3, only the first supply valve 6 is opened to suck back the urea water kept in the first supply valve 6 and the urea water in the supply path L2. At this moment, in principle, there is no move of the urea water kept in the second supply valve 16 and the urea water in the supply path L3.

At a time when it is expected that suck-back of the urea water in the first supply valve 6 and in the supply path L2 is completed, suck-back of the urea water on the second supply valve 16-side is started. If the second supply valve 16 is opened while the first supply valve 6 is kept open even after completion of the suck-back of the urea water on the first supply valve 6-side the pressure-feed capacity of the pump 7 is not efficiently allocated to suck back the urea water on the second supply valve 16-side. As result, this makes the urea water in the supply path unlikely to be sufficiently sucked back to the urea water tank 9 even after elapse of the second estimated valve-opening time of the second supply valve 16.

The first estimated valve-opening time Tov1 and the second estimated valve-opening time Tov2 in the second pattern are calculated by taking into account this potential problem. It is here assumed that the volume of urea water kept in the first supply valve 6 is equal to the volume of urea water kept in the second supply valve 16. With regard to suck-back of the urea water, the amount of urea water to be sucked back from the first supply valve 6-side is accordingly smaller than the amount of urea water to be sucked back from the second supply valve 16-side by the predetermined volume ΔV that is the difference between the capacities of the supply path L3 and the supply path L2. By taking into account this difference, the first estimated valve-opening time Tov1 of the first supply valve 6 thus needs to be shorter than the second estimated valve-opening time Tov2 of the second supply valve 16 by a time corresponding to the predetermined volume ΔV.

More specifically, the first estimated valve-opening time Tov1 and the second estimated valve-opening time Tov2 are calculated according to Equations (4) and (5) given below:

$$Tov1 = V1/\alpha \quad (4)$$

$$Tov2 = Tov1 + \Delta V/\alpha \quad (5)$$

The common path valve-opening time Tov3 is calculated according to Equation (6) given below:

$$Tov3 = V2/\alpha \quad (6)$$

As clearly understood from the above equations, the first estimated valve-opening time Tov1 is set to be shorter than the second estimated valve-opening time Tov2 by a time corresponding to the predetermined volume ΔV (i.e., ΔV/α, this time corresponds to the first control time of the claims). In the second pattern, as shown in FIGS. 5(c) and 5(d), only the first supply valve 6 is opened at the time t3. At the time t4 after elapse of the first estimated valve-opening time Tov1, the first supply valve 6 is closed and simultaneously the second supply valve 16 is opened. After the time t4, the urea water in the supply path L3 and in the supply path L1 is sucked back by opening the second supply valve 16. With regard to the suck-back, the second supply valve 16 is kept open for a time estimated to be required for sucking back the urea water in these supply paths L3 and L1, i.e., until a time t6 after elapse of the total time of the second estimated valve-opening time Tov2 and the common path valve-opening time Tov3. A time t5 denotes a time after elapse of the second estimated valve-opening time Tov2 from the time t4. Such open-close control of the respective supply valves 6 and 16 starts decreasing the amount of urea water in the supply path L2 at the time t3 and completes the suck-back at the time t4 (as shown in FIG. 5(e)). The open-close control starts decreasing the amount of urea water in the supply path L3 at the time t4 and completes the suck back at the time t5 prior to the time t6 (as shown in FIG. 5(f)).

As shown in FIG. 5(g), immediately after the time t3 when the first supply valve 6 is opened, a negative pressure suitable for suck-back is generated in the supply path L1. This causes the urea water in the supply path L2 to be sucked back into the urea water tank 9. Immediately after the time t4 when the second supply valve 16 is opened, a negative pressure suitable for suck-back is also generated in the supply path L1. This clearly shows that sucking back the urea water remaining in the supply path L3 is suitably performed after completion of sucking back the urea water in the supply path L2. The open-close control of the respective supply valves in the second pattern controls the valve-opening times of the respective supply valves according to the predetermined volume ΔV, thus reducing the likelihood that the urea water is not sufficiently sucked back but remains in the supply path.

(3) Third Pattern

The following describes a third pattern of the open-close control of the respective supply valves with reference to FIG. 6. The ignition signal is turned OFF at a time t1 as shown in FIG. 6(a), and the pump 7 is reversely rotated at a time t2 as shown in FIG. 6(b) after elapse of the predetermined standby time (processing of S104). The pump 7 has the constant rotation speed and maintains the substantially constant pressure-feed capacity as described above. The processing of S105 is subsequently started at a time t3.

In the third pattern, as shown in FIGS. 6(c) and 6(d), the first supply valve 6 is opened at the time t3 and is closed at the time t4 in part of the first estimated valve-opening time Tov1, while the second supply valve 16 is kept closed. The state that only the first supply valve 6 is open for a short time is referred to as first preferential suck-back period. In a time period from the time t4 to a time t5 that is part of the second estimated valve-opening time Tov2, on the contrary, the second supply valve 16 is open, while the first supply valve 6 is closed. The state that only the second supply valve 16 is open for a short time is referred to as second preferential suck-back period. After the time t5, both the first supply valve 6 and the second supply valve 16 are open. The respective supply valves 6 and 16 are kept open until times corresponding to the respective estimated valve-opening times.

As described above, in the third pattern, the initial stage of the suck-back of urea water includes the first preferential suck-back period and the second preferential suck-back period. These first and second preferential suck-back periods are provided to suck back the urea water kept in the respective supply valves to at least outside of the supply valves. As described above, when the urea water remains in any of the supply valves and the supply paths in the state that the supply of urea water to the exhaust emission is stopped, ammonia produced from the remaining urea water may cause corrosion or the like of the supply valve or the supply path. Especially the respective supply valves 6 and 16 are exposed to the exhaust passages 2 and 12 and thereby to the relatively high-temperature environment and are thus susceptible to the produced ammonia. The first preferential suck-back period and the second preferential suck-back period are accordingly provided to suck back the urea water kept in the respective supply valves as soon as possible to the outside of the supply valves after the stop of the internal combustion engine 1 and thereby reduce the potential effect of the produced ammonia.

The first estimated valve-opening time Tov1 and the second estimated valve-opening time Tov2 in the third pattern are calculated by taking into account this suck-back configuration. It is here assumed that the volume of urea water kept in the first supply valve 6 and the volume of urea water kept in the second supply valve 16 are both equal to a volume V11. With regard to suck-back of the urea water, the amount of urea water to be sucked back from the first supply valve 6-side is accordingly smaller than the amount of urea water to be sucked back from the second supply valve 16-side by the predetermined volume ΔV that is the difference between the capacities of the supply path L3 and the supply path L2. The estimated valve opening times of the respective supply valves 6 and 16 are thus set by taking into account this predetermined volume ΔV.

In the third pattern, as shown in FIGS. 6(c) and 6(d), both the supply valves 6 and 16 are open after elapse of the first preferential suck-back period and the second preferential suck-back period, i.e., after the time t5. As described above, the capacity of the supply path L2 is smaller than the capacity of the supply path L3 by the predetermined volume ΔV, so that the suck-back of the urea water in the supply path L2 is completed at the earlier timing. If the first supply valve 6 is kept open even after completion of sucking back the urea water in the supply path L2, the pressure-feed capacity of the pump 7 is not efficiently allocated to suck back the urea water remaining in the supply path L3. As a result, this makes the urea water in the supply path unlikely to be sufficiently sucked back to the urea water tank 9 even after elapse of the estimated valve-opening times of the respective supply valves 6 and 16. After the time t5, the first supply valve 6 is accordingly closed at a time t6 prior to a time t7 which corresponds to the predetermined volume ΔV and is an end time of the second estimated valve-opening time. This provides the state suitable for sucking back the urea water in the supply path L3.

More specifically the first estimated valve-opening time Tov1 and the second estimated valve-opening time Tov2 are calculated according to Equations (7), (8), and (9) given below:

$$\text{Tov1 in time period from time } t3 \text{ to time } t4 = V11/\alpha \quad (7)$$

$$\text{Tov1 in time period from time } t5 \text{ to time } t6 = (V1 - V11)/(\alpha/2) \quad (8)$$

$$\text{Tov2} = \text{total Tov1} + \Delta V/\alpha \quad (9)$$

The common path valve-opening time Tov3 is calculated according to Equation (10) given below:

$$\text{Tov3} = V2/\alpha \quad (10)$$

Accordingly the first estimated valve-opening time Tov1 is set to be shorter than the second valve-opening time Tov2 by a time corresponding to the predetermined volume ΔV (i.e., ΔV/α, this time corresponds to the first control time of the claims).

Such open-close control of the respective supply valves 6 and 16 starts decreasing the amount of urea water in the supply path L2 at the time t3, stops decreasing at the time t4, restarts decreasing at the time t5 and completes the suck-back at the time t6 (a shown in FIG. 6(e)). The open-close control starts decreasing the amount of urea water in the supply path L3 at the time t4 and completes the suck back at the time t7 after the time t6 (as shown in FIG. 6(f)). After the time t6, since the first supply valve 6 is closed, the entire pressure-feed capacity of the pump 7 is allocated to suck back the urea water in the supply path L3. This increases the decrease rate of the urea water after the time t6, compared with that before the time t6.

As shown in FIG. 6(g), a negative pressure suitable for suck-back is generated in the supply path L1 immediately after the time t3 when only the first supply valve 6 is opened and immediately after the time t4 when only the second supply valve 16 is opened. This causes the urea water in the respective supply valves 6 and 16 to be sucked back to outside. Subsequently both the supply valves 6 and 16 are open to suck back the urea water in the supply paths L2 and L3. The negative pressure in the supply path L1 is relieved with elapse of time. The suck-back of the urea water in the supply path L2 is completed at the time t6. Closing the first supply valve 6 provides again a negative pressure suitable for suck-back in the supply path L1. This clearly shows that sucking back the urea water remaining in the supply path L3 suitably continues after completion of sucking back the urea water in the supply path L2. The open-close control of the respective supply valves in the third pattern preferentially sucks back the urea water kept in the respective supply valves and thereby protects the supply valves from corrosion by the produced ammonia. This open-close control then controls the valve-opening times of the respective supply valves according to the predetermined volume ΔV, thus reducing the likelihood that the urea water is not sufficiently sucked back but remains in the supply path.

Second Embodiment

Figure 7:
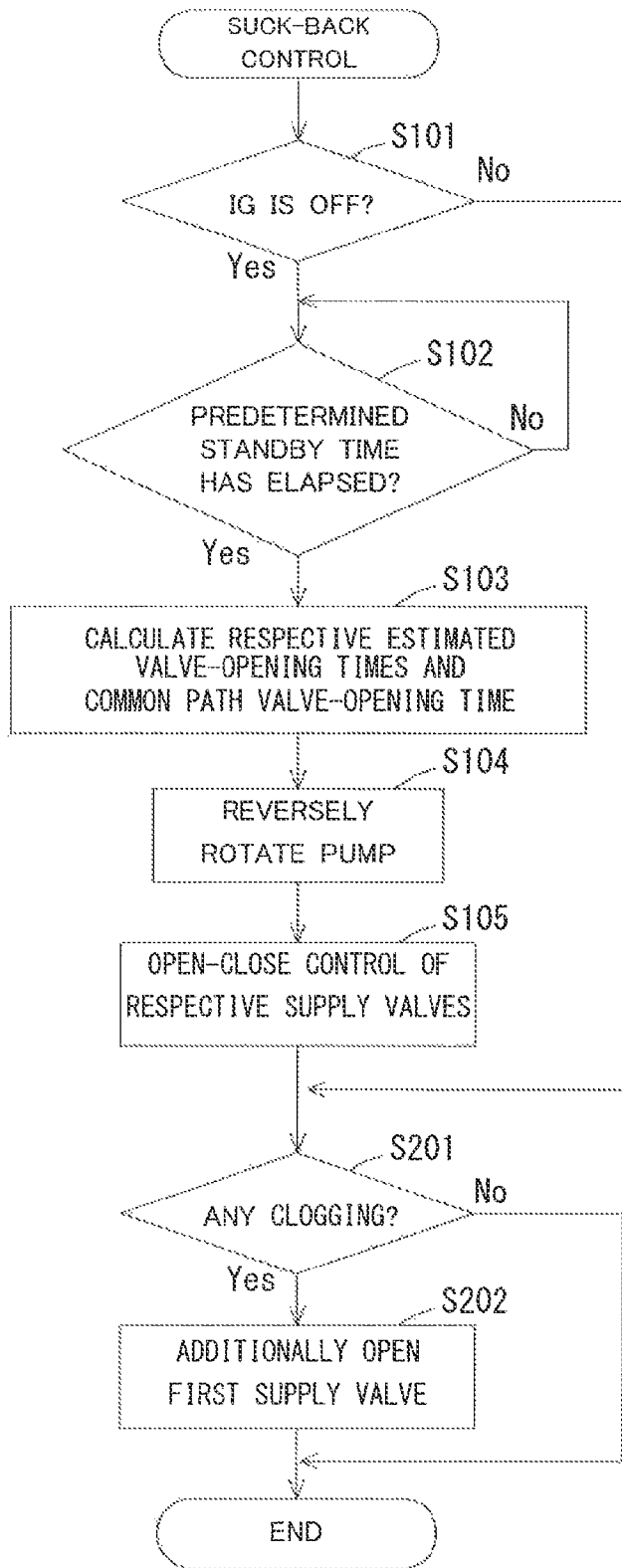
FIG. 7 is a flowchart showing a second flow of suck-back control of urea water performed in the urea water supply system shown in FIG. 1 or FIG. 2.

The following describes a second embodiment with regard to open-close control of the respective supply valves in suck-back control of urea water with reference to FIG. 7. The suck-back control shown in FIG. 7 is performed by the ECU 20 like the suck-back control shown in FIG. 3. The like steps in the suck-back control of FIG. 7 that are substantially similar to the steps in the suck-back control of FIG. 3 are expressed by the like step numbers and are not specifically described here. In this embodiment, it is assumed that the open-close control in the first pattern is performed as the open-close control of the respective supply valves at S105.

Figure 8:
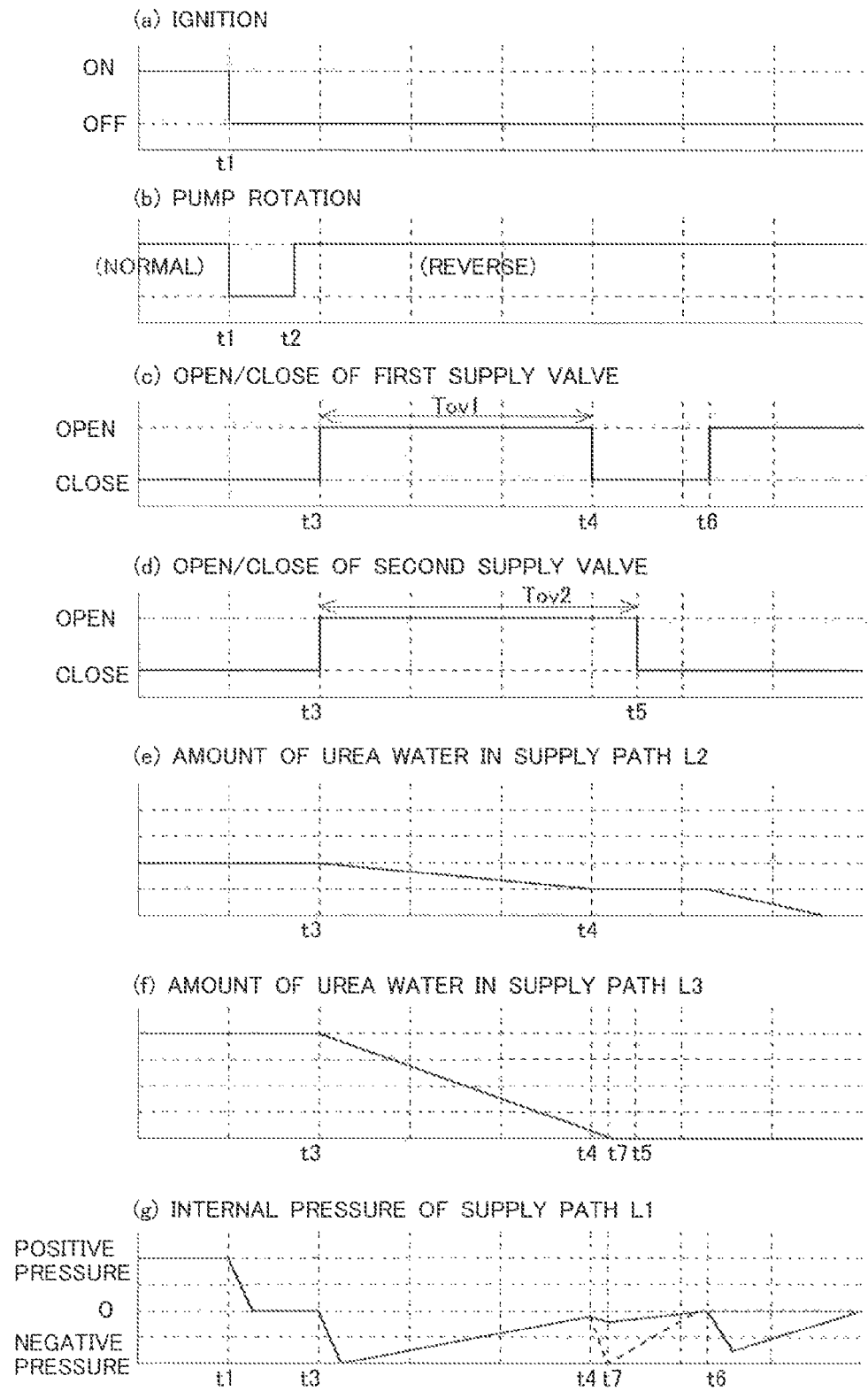
FIG. 8 is a time chart showing variations of the control elements such as the supply valves in the course of the suck-back control of FIG. 7.

In this embodiment, after the processing of S105, the flow performs a clogging determination process with regard to clogging in the first supply valve 6 at S201. According to this embodiment, like the first pattern, the first estimated valve-opening time Tov1 is set to be shorter than the second estimated valve-opening time Tov2 by the time corresponding to the predetermined volume ΔV (i.e., ΔV/α). In this embodiment, as shown in FIGS. 8(c) and 8(d), the respective supply valves 6 and 16 are opened at a time t3, and the first supply valve 6 is closed at a time t4 after elapse of the first estimated valve-opening time Tov1. At the time t4, urea water still remains in the supply path L3. After the time t4, the urea water in the supply path L3 and the supply path L1 is continuously sucked back in the state that the second supply valve 16 is open.

In the case that the first supply valve 6 is clogged, the pressure-feed capacity of the pump 7 is not efficiently allocated to the first supply valve 6-side for the first estimated valve-opening time Tov1 between the time t3 and the time t4 when the first supply valve 6 is open. This makes the urea water in the first supply valve 6 and the urea water in the supply path L2 unlikely to be sucked back as expected. The allocation of the pressure-feed capacity of the pump 7 that should be allocated to the first supply valve 6-side is, on the other hand, allocated to the second supply valve 16-side. When the second supply valve 16 is not clogged, this may result in completing the suck-back of the urea water in the second supply valve 16 and the urea water in the supply path L3 at a time t7 prior to a time t5 that is an expected end time (as shown in FIG. 8(f)). In other words, clogging of the first supply valve 6 causes the urea water to still remain in the supply path L2 even at the time t4 after elapse of the first estimated valve-opening time as shown in FIG. 8(e), while the amount of urea water in the supply path L3 has already reached zero prior to the time t5 after elapse of the second estimated valve-opening time. In this state, the open-close control of the first pattern is unlikely to achieve the effective suck-back of urea water.

FIG. 8(g) shows a variation in internal pressure of the supply path L1 when the first supply valve 6 is clogged. In FIG. 8(g), a solid-line curve shows a pressure variation according to this embodiment, and a broken-line curve shows a pressure variation in the first pattern described above. Immediately after the time t3 when the first supply valve 6 and the second supply valve 16 are opened simultaneously, a negative pressure suitable for suck-back is generated in the supply path L1. In the state of this negative pressure, the urea water in the supply path L2 and the urea water in the supply path L3 are expected to be sucked back to the urea water tank 9. In the actual pattern, however, clogging of the first supply valve 6 accelerates the suck-back of the urea water in the supply path L3. Accordingly, at the time t4, a less amount of urea water than expected remains in the supply path L3. This results in failing to generate a negative pressure sufficient for suck-back in the supply path L1 even when the first supply valve 6 is closed and the second supply valve 16 is kept open at the time t4.

Figure 9:
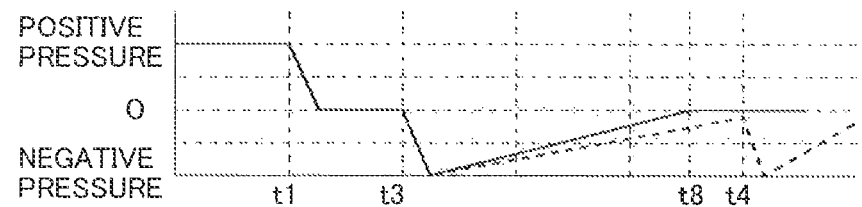
FIG. 9 is a first diagram showing a pressure variation in a supply path in the state that a first supply valve is clogged in the urea water supply system for the exhaust emission control device of the internal combustion engine according to the invention.

At S201 in the suck-back control of this embodiment, when the internal pressure of the supply path L1 does not reach a predetermined negative pressure in a time period between the time t4 after elapse of the first estimated valve-opening time of the first supply vale 6 and the time t5 after elapse of the second estimated valve-opening time of the second supply valve 16, it is determined that the first supply valve 6 is clogged and that clogging causes the urea water in the supply path L2 to be not sucked back as expected but causes the urea water in the supply path L3 to be sucked back beyond expectation (i.e., an affirmative answer is given at S201). When the internal pressure value of the supply path L1 is equal to or lower than a predetermined threshold value (i.e., value close to the negative pressure value in the case of no clogging), on the other hand, it is determined that the predetermined negative pressure is generated (i.e., a negative answer is given at S201). When the internal pressure of the supply path L1 becomes close to the atmospheric pressure (i.e., zero in FIG. 8(g) at a time t8 prior to the time t4 as shown by a solid-line curve in FIG. 9, this means that the urea water in the supply path L3 has been sucked back beyond expectation. It is accordingly determined that the first supply valve 6 is clogged. A pressure variation shown by a broken-line curve in FIG. 9 is identical with the pressure variation shown by the broken-line curve in FIG. 8(g).

When it is determined that the first supply valve 6 is clogged (i.e., in response to an affirmative answer at S201), the flow additionally opens the first supply valve 6 at a time t6 subsequent to the time t5 after elapse of the second estimated valve-opening time of the second supply valve 16 (S202). In this state, the second supply valve 16 is kept closed. This generates a negative pressure suitable for suck-back of urea water in the supply path L1 and thereby enables the urea water remaining in the supply path L2 due to clogging to be sucked back. It may be determined that the suck-back of urea water by the additional valve-opening of the first supply valve 6 is completed when the internal pressure of the supply path L1 becomes close to the atmospheric pressure (i.e., zero in FIG. 8(g)). In response to a negative answer at S201, the flow skips the processing of S202 and terminates this control flow.

<Modification of Clogging Determination>

Figure 10:
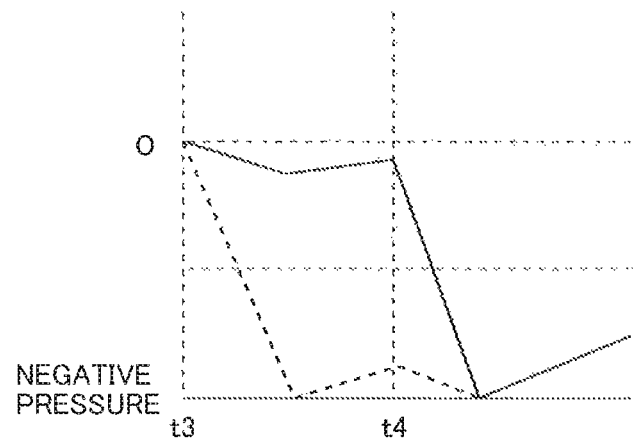
FIG. 10 is a second diagram showing a pressure variation in the supply path in the state that the first supply valve is clogged in the urea water supply system for the exhaust emission control device of the internal combustion engine according to the invention.

The second embodiment described above determines clogging of the first supply valve 6, based on the variation in internal pressure of the supply path L1 before and after the time t4 in the first pattern described above. According to a modification, clogging of the first supply valve 6 may be determined based on the internal pressure value of the supply path L1 or its variation when each of the supply valves is opened individually according to its estimated valve-opening time like the second pattern or the third pattern. As an example of such modification, a solid-line curve of FIG. 10 shows a variation in internal pressure of the supply path L1 in a time period around times t3 and t4 during open-close control in the second pattern or in the third pattern in the state that the first supply valve 6 is clogged. A broken-line curve of FIG. 10 shows a pressure variation in the state that the first supply valve 6 is not clogged and is equivalent to the pressure variation in FIG. 6(g). When the first supply valve 6 is clogged in either of these patterns, the internal pressure value of the supply path L1 may not reach a desired negative pressure by valve-opening of the first supply valve 6 or its pressure variation may be slowed down due to clogging so as to decrease a variation in pressure relative to time elapsed, as shown by the solid-line curve of FIG. 10. Clogging of the first supply valve 6 may thus be determined, based on the internal pressure value of the supply path L1 or its pressure variation per unit time.

The open-close control of the respective supply valves in any of the first to the third patterns is performed at S105 in the suck-back control of FIG. 3 or FIG. 7. This effectively implements the suck-back of urea water into the urea water tank 9 during stop of the internal combustion engine 1 and suppresses the potential adverse effects of produced ammonia on the respective supply valves and the respective supply paths. The suck-back control with clogging determination of the first supply valve 6 shown in FIG. 7 is especially suitably applicable to the exhaust emission control device of the internal combustion engine 1 shown in FIG. 2. This is because the first supply valve 6 is placed corresponding to the first NOx catalyst 5 located on the upstream side in the exhaust emission control device shown in FIG. 2 and is exposed to the environment that causes a larger amount of soot to be included in the exhaust emission and is more likely to clog the supply valve, compared with the second supply valve 16.

Modification

In the above embodiments, it is assumed that the amount of urea water kept in the first supply valve 6 is equal to the amount of urea water kept in the second supply valve 16. The respective supply valves may however, be configured to keep different amounts of urea water. In this case, the suck-back control of the respective supply valves in the first pattern or in the second pattern described above may be performed with reflection of the difference in kept pattern on the predetermined volume ΔV. For example, when the amount kept in the first supply valve 6 is less than the amount kept in the second supply valve 16, the above open-close control may be performed with increasing the predetermined volume ΔV by the difference. In the opposite case, the above open-close control may be performed with decreasing the predetermined volume ΔV by the difference. The suck-back control in the third pattern may perform the open-close control of the respective supply valves to provide the first preferential suck-back period and the second preferential suck-back period corresponding to the kept amounts of the respective supply valves. The variation in difference between the first estimated valve-opening time and the second estimated valve-opening time due to the difference in kept amount corresponds to the second control time of the claims.

The invention claimed is:

1. In an exhaust emission control device that is provided in an exhaust passage of an internal combustion engine and has a first NOx catalyst and a second NOx catalyst configured to reduce NOx by using ammonia as a reducing agent, a urea water supply system that supplies urea water to the exhaust passage, the urea water supply system comprising:
a first supply valve that is located in upstream of the first NOx catalyst and is configured to supply urea water to an exhaust emission flowing into the first NOx catalyst;
a second supply valve that is located in upstream of the second NOx catalyst and is configured to supply the urea water to the exhaust emission flowing into the second NOx catalyst;
a urea water tank that is configured to store the urea water;
a urea water supply path that is arranged to connect the urea water tank with each of the first supply valve and the second supply valve and includes a first supply path which only the urea water to be supplied to the first supply valve flows through and a second supply path which only the urea water to be supplied to the second supply valve flows through, wherein the second supply path has a larger capacity than capacity of the first supply path by a predetermined volume;
a pump that is configured to pressure-feed the urea water in the urea water supply path; and
a controller that is configured to perform suck-back control of the urea water in the first and second supply valves and in the urea water supply path by operating the pump in a specified operating state, opening the first supply valve for a first estimated valve-opening time that is a valve-opening time of the first supply valve estimated to be required for the suck-back control of the urea water in the first supply valve and in the first supply path and opening the second supply valve for a second estimated valve-opening time that is a valve-opening time of the second supply valve estimated to be required for the suck-back control of the urea water in the second supply valve and in the second supply path, the controller performing open-close control of the first supply valve and the second supply valve in the suck-back control such that the first estimated valve-opening time is shorter than the second estimated valve-opening time by at least a first control time corresponding to the predetermined volume.

2. The urea water supply system according to claim 1, wherein the first supply valve and the second supply valve are configured such as to provide a difference between an amount of the urea water kept in the first supply valve and an amount of the urea water kept in the second supply valve, and
the controller reflects a second control time corresponding to the difference in kept amount of urea water on the first control time.

3. The urea water supply system according to claim 1, wherein in the suck-back control, the controller operates the pump in the specified operating state, individually performs a valve-opening operation bar sucking back the urea water kept in the first supply valve and a valve-opening operation for sucking back the urea water kept in the second supply valve, and subsequently performs the open-close control of the first supply valve and the second supply valve to suck back the urea water in the first supply path and in the second supply path.

4. The urea water supply system according to claim 1, further comprising
a determiner that is configured to perform a determination process of determining whether either of the first supply valve and the first supply path is clogged, based on a pressure in the urea water supply path or in the pump during the suck-back control, wherein
when the determiner determines that the first supply valve or the first supply path is clogged, the controller additionally opens the first supply valve after elapse of the first estimated valve-opening time in the suck-back control, while operating the pump in the specified operating state.

5. The urea water supply system according to claim 4, wherein the determiner performs the determination process, based on a pressure value in the urea water supply path or in the pump or a pressure variation per unit time in the urea water supply path or in the pump in a state that the pump is maintained in the specified operating state for the suck-back control, the first supply valve is open and the second supply valve is closed.

6. The urea water supply system according to claim 4, wherein the determiner determines that the first supply valve or the first supply path is clogged when a predetermined negative pressure condition is not provided in the urea water supply path or in the pump in a state that the first supply valve is closed and only the second supply valve is open, after elapse of the first estimated valve-opening time in a state that the pump is maintained in the specified operating state for the suck-back control and both the first supply valve and the second supply valve are open.

7. The urea water supply system according to claim 4, wherein the determiner determines that the first supply valve or the first supply path is clogged when a pressure value in the urea water supply path or in the pump becomes close to an atmospheric pressure before elapse of the first estimated valve-opening time in a state that the pump is maintained in the specified operating state for the suck-back control and both the first supply valve and the second supply valve are open.

8. The urea water supply system according to claim 4, wherein the first NOx catalyst and the second NOx catalyst are arranged in series along a flow of the exhaust emission in the exhaust passage of the internal combustion engine, and
the first NOx catalyst is placed in upstream of the second NOx catalyst.

* * * * *